Aug. 30, 1955 J. V. McNULTY 2,716,720
ENGINE IGNITION APPARATUS AND PROCEDURE
Filed May 22, 1951 3 Sheets-Sheet 1
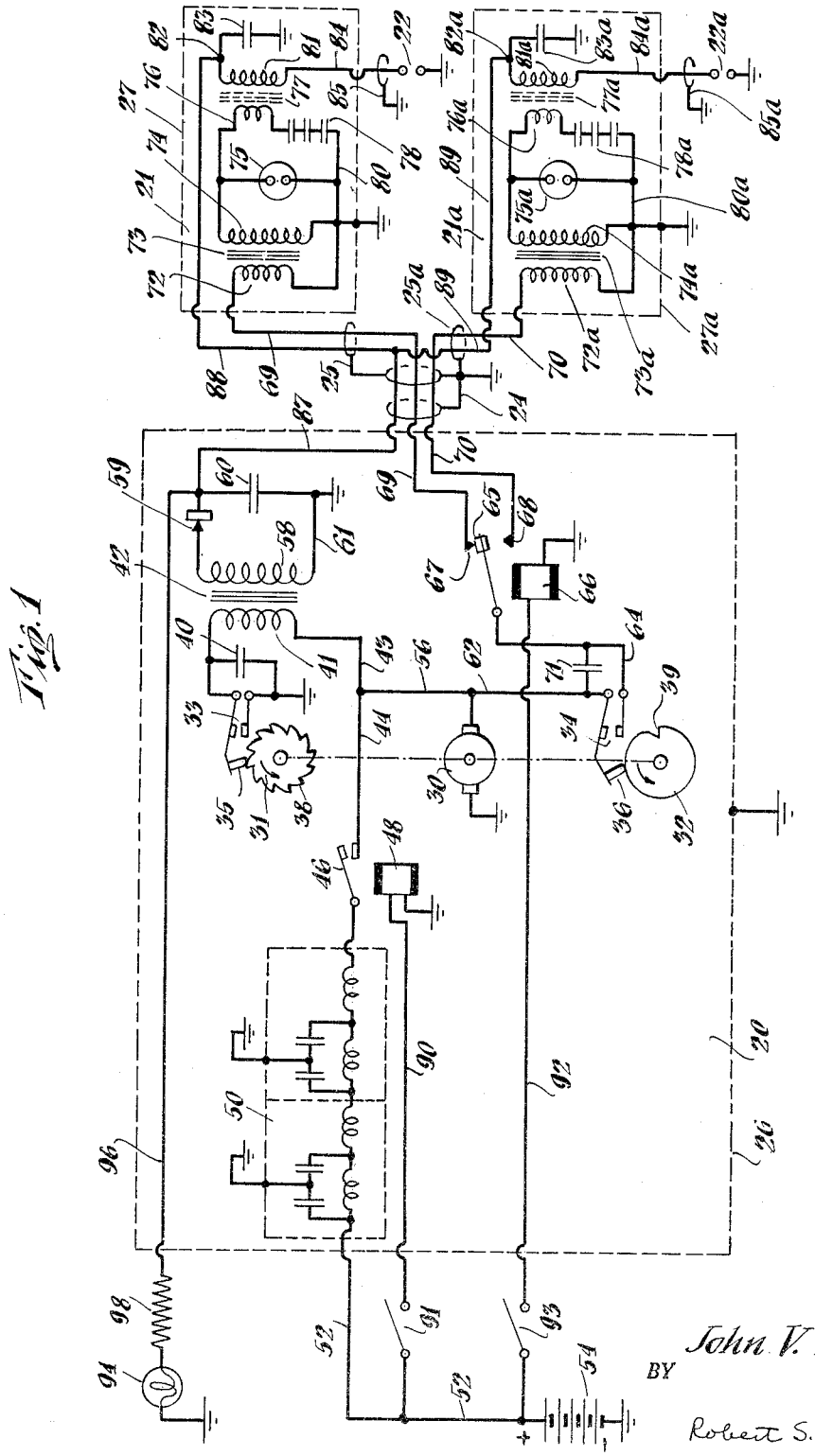
INVENTOR.
John V. McNulty
BY
Robert S. Dunham
ATTORNEY

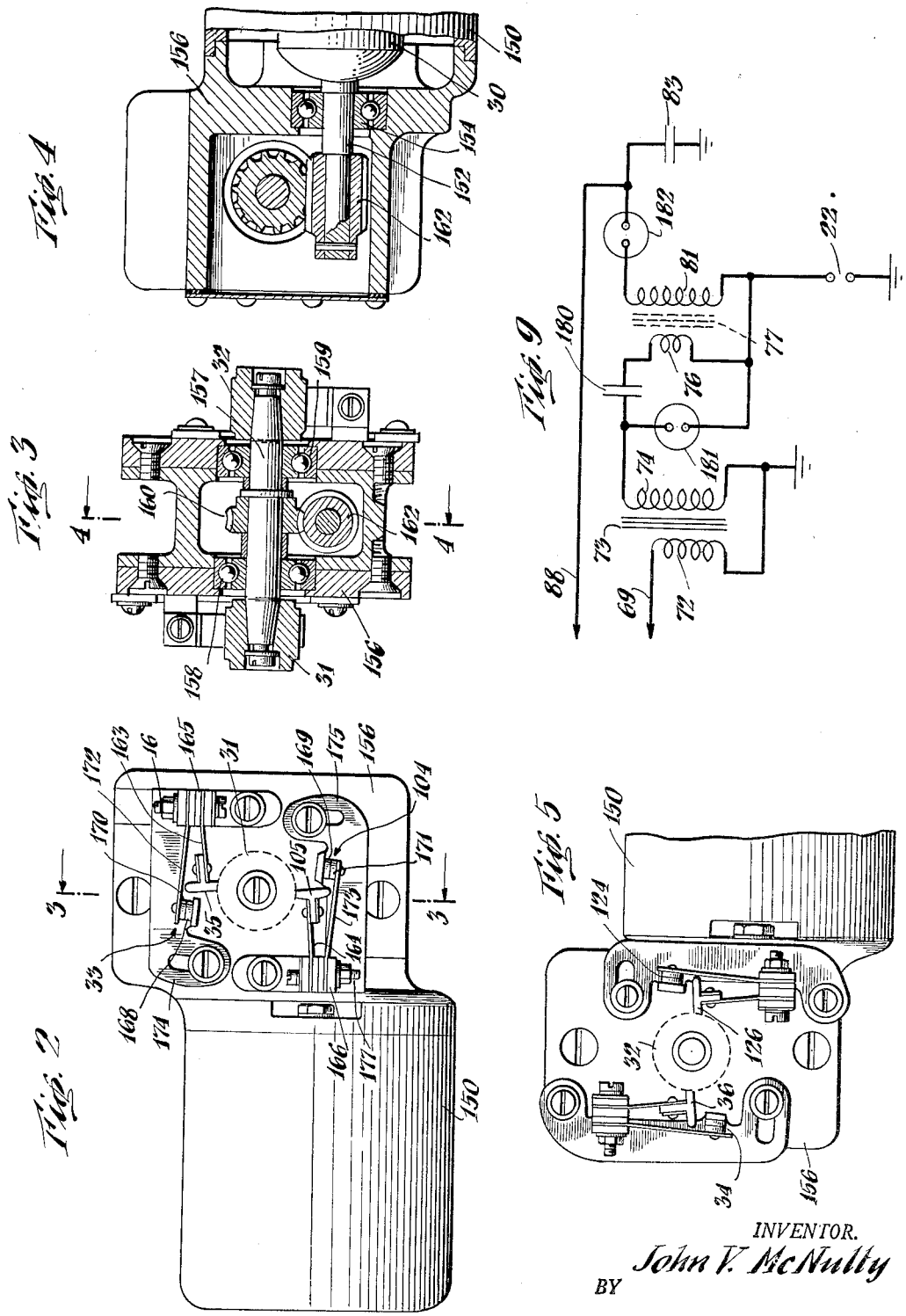

Aug. 30, 1955    J. V. McNULTY    2,716,720
ENGINE IGNITION APPARATUS AND PROCEDURE
Filed May 22, 1951    3 Sheets-Sheet 3
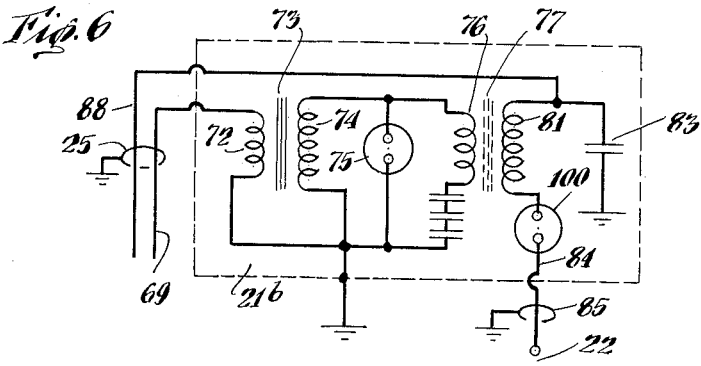
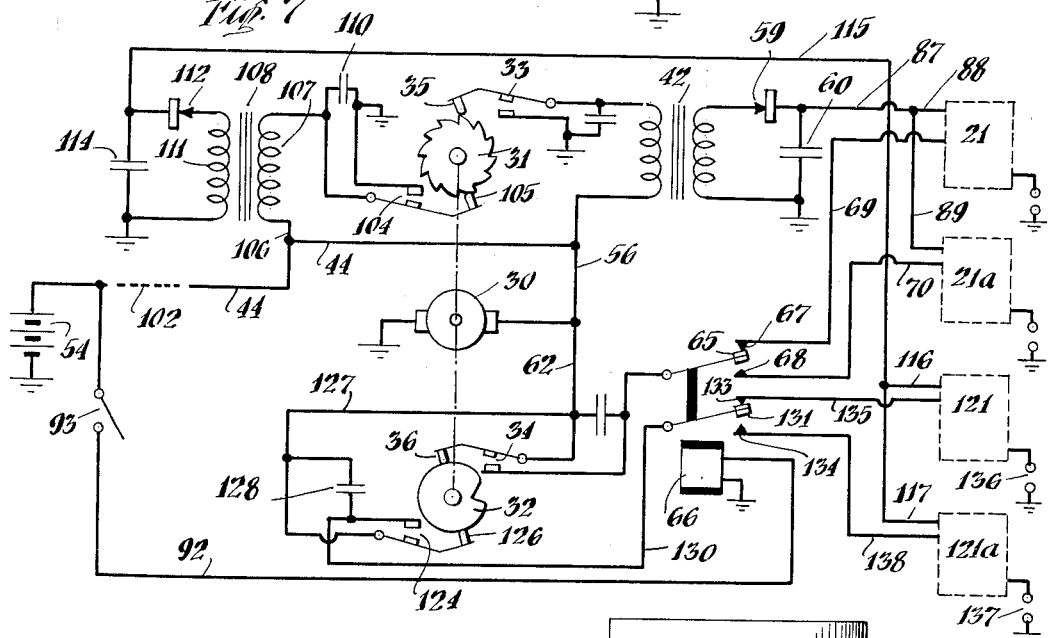
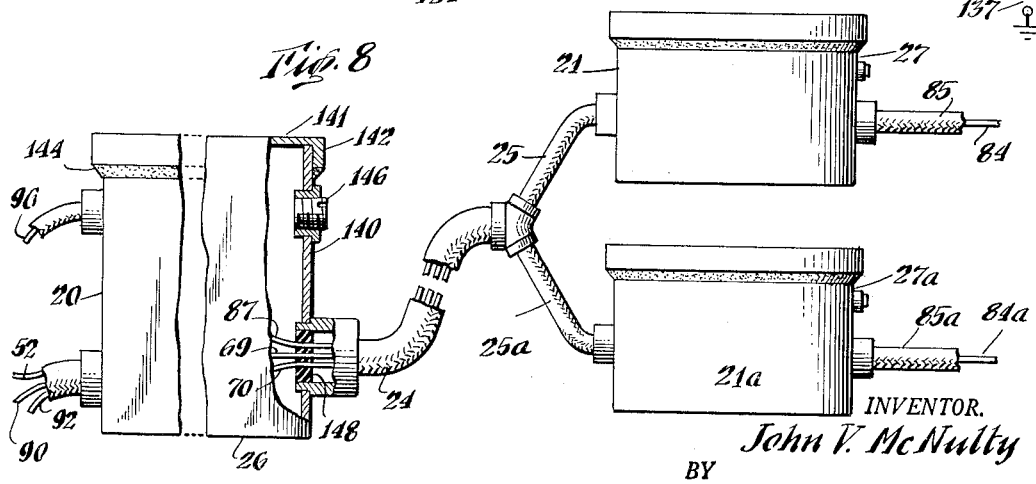
INVENTOR.
*John V. McNulty*
BY
*Robert S. Dunham*
ATTORNEY

United States Patent Office 2,716,720

Patented Aug. 30, 1955

2,716,720

ENGINE IGNITION APPARATUS AND PROCEDURE

John V. McNulty, Norwich, N. Y., assignor to General Laboratory Associates, Inc., Norwich, N. Y., a corporation of New York Application May 22, 1951, Serial No. 227,721

25 Claims. (Cl. 315—180)

This invention relates to spark ignition for engines powered by internal combustion, particularly engines of the so-called jet or direct expansion type.

Whereas various kinds of jet engines, unlike those of the reciprocating type, usually do not require a continuously functioning and repetitively timed spark system, they nevertheless present special and rigorous requirements of ignition. The circumstances of the fuel, e. g. often of a very low grade, and the circumstances of the combustible or explosive mixtures to be fired are commonly such that a considerably higher energy spark is needed in jet engines than is ordinarily required for the cylinders of various types of reciprocating gasoline motors. Not only may it be more difficult to ignite the type of fuel or type of mixture present in the combustion chamber, but the ignition system must be capable of functioning perfectly and of effecting ignition at very high altitudes and under extremely abnormal conditions, of temperature (i. e. extreme cold), low pressure and the like. Such conditions may make the fuel much harder to ignite and may impair the spark generating procedure, especially in that conditions of low barometric pressure tend to cause breakdown, flash-over or other failure of the electrical equipment. Because of the greater difficulty encountered in effecting a spark or in producing a spark of suitable energy requirement, it has been thought advisable to use relatively very high voltages in the spark supply circuits; yet the higher voltages ordinarily tend to enhance the unreliability of the equipment, particularly in respect to the various types of failure mentioned above.

Another problem of peculiar severity in the case of direct expansion engines is the tendency of the spark plugs to foul and indeed to become short-circuited or otherwise ineffectual; the nature of the fuel and other circumstances of combustion tend to deposit relatively large amounts of carbon or other waste products, and especially to build up such deposits on the spark plug electrodes or points.

It will be understood that whereas jet engines as used in aircraft, for instance, are customarily started when the vessel is on the ground, need for re-ignition may frequently arise during subsequent travel or maneuvering of the vessel. For example, if a so-called blow-out occurs when the airplane is at a high altitude or is executing a dive or other special maneuver, immediate and absolutely dependable operation of the ignition system is required, so as to generate the necessary spark (usually a series of sparks) to re-ignite the fuel mixture and restore the engine to working condition. Like dependability is, of course, highly desirable for initial starting of the aircraft.

A primary object of the present invention is to provide spark ignition which will satisfactorily meet the unusual requirements of jet engines and the like, as explained above. A particular object is to provide new, improved and more efficient ignition methods and means that will deliver spark discharges of high energy, in a fully dependable manner and under a wide variety of operating conditions. Further objects are to provide such apparatus, of novel and effective type: which is peculiarly free of susceptibility to flash-over, or other break-down or failure; which affords a desirably high voltage for initial ionization or break-down at the spark gap in the engine and yet minimizes the high voltage paths and the susceptibility of the equipment to failure by undesired leakages and discharges from such paths; which maintains the energy supply at relatively moderate or intermediate voltages in all but a minimum portion of the electrical system; which is adapted for convenient and simple energization by means readily available on the aircraft or other vessel or vehicle; and which is specially or inherently adapted to resist or remove the effects of electrode-fouling influences, so that more positive assurance of a desired, high energy spark, is obtained than has been possible with equipment heretofore available.

Another object is to provide improved methods and apparatus for ignition in jet engines so as to yield a high energy spark, and indeed a spark with very high peak energy, such procedure and system being fully operative under extreme conditions of altitude, air flow, temperature and humidity. Additional objects are to provide improved spark generators: which are of simplified and rugged design, avoiding delicate or unreliable electronic devices; which may be easily controlled; which may afford ready indication of their operation; and in which interference with radio equipment or the like is minimized.

A still further object is to afford novel and simplified apparatus for effecting spark ignition at a plurality of localities, either simultaneously or alternatively, for example so as to actuate a plurality of ignitor plugs at corresponding localities in the main combustion systems of one or more engines, or so as to provide alternative operation of igniter plugs either in the main combustion chamber or in the so-called after-burner of a given engine. It will be understood that certain types of jet engines have an after-burner section where at certain times or under certain conditions additional fuel may be ignited to contribute supplemental power. Other objects are to afford apparatus of the character described which can be embodied in a compact and lightweight form, and in which various components may serve multiple functions in achieving spark ignition at a plurality of places.

To these and other ends, the methods and systems of the present invention involve the use, in a novel combination of steps and elements, of the high energy discharge principle wherein a high voltage impulse is caused to initiate a spark across an ordinarily non-conducting space, while further electrical energy is supplied to the circuit, to augment or fortify the discharge at the gap, from a condenser in which such energy has been stored. In accordance with the present invention, the condenser is charged by a succession of separate impulses of electrical energy, which may be spaced in time and determined in number by mechanical control. The cooperating high voltage system is triggered by a pulse of current which may be separately created at a time when the condenser becomes fully charged.

More specifically, in systems embodying preferred features of the invention, the two impulse-creating means are actuated and timed in common by a suitable mechanical system, for example under the drive of an electric motor or the like. A peculiarly effective arrangement comprises cam-operated contacts or switches in the supply circuits for the condenser-charging impulses and for the triggering impulses to the high voltage system. Thus one of the cam devices is so designed and operated that a predetermined series of makes and breaks are effectuated in a low voltage supply circuit. Through means such as a transformer, the pulses constituted at the successive breaks are stepped up and delivered to the condenser, advantageously through a rectifier, so that the condenser is unidirectionally charged by accumulation of the successive, separate pulses, yet cannot discharge through the charging circuit. The other or triggering cam device is mechanically timed and arranged so that a corresponding breaker in a like, low voltage supply circuit interupts the latter at every time when the condenser has received a predetermined number of impulses. Through a step-up transformer feeding an oscillatory circuit which in turn supplies a high tension or high frequency transformer, the impulse derived at the break of the trigger circuit is converted to a brief oscillatory pulse of extremely high voltage in the ultimate output circuit which extends to the spark gap in the engine chamber, i. e. the ignitor plug. In consequence, a spark is created between electrodes or points of the latter.

The energy-storing condenser being connected directly to the high voltage output circuit, a very considerable current, with high peak energy, flows briefly through the high voltage circuit when the spark is initiated by the breakdown or ionization impulse. That is to say, the high voltage, establishes a initiated in the gap by the high voltage, establishes a conductive condition for continuing flow of current to discharge the condenser, even though the potential of the condenser is very advantageously at no more than a moderate or intermediate value which would be insufficient, in itself, to initiate a spark. As will be explained in greater detail below, systems of the sort just described have great advantages in reliability, efficiency, and simplicity of structure, as well as in the provision of unusually high-energy spark discharges. Further features of the invention include a variety of controlling, structural and protective arrangements or operations, which are also described hereinbelow, and which contribute to the attainment of the foregoing and other advantages, in practical operation.

By way of example, certain presently preferred forms of the invention are illustrated in the accompanying drawings, wherein:

Fig. 1 is a wiring diagram of one embodiment of the improved spark-generating system, schematically illustrating the novel combination of elements;

Fig. 2 is an elevation, showing one side of a motor-actuated breaker device which may be employed in the system of Fig. 1;

Fig. 3 is a vertical section on line 3—3 of Fig. 2;

Fig. 4 is a view of the other side of the device of Fig. 2, but showing the breaker drive in vertical section on line 4—4 of Fig. 3;

Fig. 5 is a fragmentary view showing in elevation the other side of the contact or breaker structure of Fig. 2;

Fig. 6 is a wiring diagram of a part of the apparatus shown in Fig. 1, embodying a modified construction;

Fig. 7 is a view, similar to Fig. 1 but showing a wiring diagram of an arrangement modified in certain further respects, so as to operate a plurality of ignitor plugs simultaneously;

Fig. 8 is a somewhat fragmentary and simplified external view of the apparatus of Fig. 1, showing the housed and sealed arrangement of certain parts; and Fig. 9 is a wiring diagram of a further modified composition, alternative to Fig. 6.

In Fig. 1 the illustrated apparatus comprises a plurality of units or sub-assemblies, viz. an exciter unit 20 and a plurality of compositor units 21, 21a, the latter being situated at or adjacent the engine, i. e. as close as possible to the respective spark gaps or ignitor plugs 22, 22a, which may be of conventional construction and at conventional locations in the engine. Connections between the exciter 20 and the compositors 21, 21a are effected through suitably shielded and grounded cable indicated at 24 and having branches 25, 25a, to the respective compositors. The exciter assembly is contained in a metal case 26, which may be grounded as shown and which constitutes an electrical shield for the enclosed components and circuits. Similarly the compositors 21, 21a may be enclosed in like metal cases 27, 27a, also grounded and serving to shield the included parts. Each of the shields 26, 27, 27a is preferably hermetically sealed, for example after original filling with dry air, so that moisture is excluded and so that the enclosed electrical elements are exposed to substantially normal atmospheric pressure even though the apparatus may be carried to high altitudes.

The compositor 20 includes an electric motor 30 which is adapted to rotate continuously a pair of cams 31, 32, respectively arranged to operate the switches or sets of breaker contacts 33, 34, e. g. by virtue of corresponding followers 35, 36 engaging the cam surfaces. While any of a variety of cam or other arrangements may be employed for mechanically actuating the switches in appropriate sequence and timing, the cam 31 is shown as having a multiplicity of lobes 38 arranged so that contacts 33 are successively closed and opened a predetermined number of times in each revolution of the cam. The cam 32 is designed, in the illustrated embodiment, to open its contacts 34 once in each revolution, the cams being driven directly together so that the contacts 34 thus break their circuit once for each time that the contacts 33 complete the predetermined number of circuit interruptions. Conveniently, the contour of the cam 32 may be high for nearly all of its circumference, having a low spot 39 of short duration, whereby the contacts 34 are momentarily closed and then opened to provide the desired electrical pulse.

Shunted by a small condenser 40 to reduce arcing, the contacts 33 are connected in a circuit which extends from the contacts through the primary 41 of a transformer 42, through conductors 43, 44, and a switch 46, which is of solenoid-operated type, i. e. adapted to be closed upon energization of a solenoid 48, and thence through a filter system 50 to a supply conductor 52 leading to one terminal, for example the positive terminal, of a battery 54. The circuit is completed through ground at the other side of the contacts 33 and the other terminal of the battery 54. While other sources of current may be employed, the battery 54 may be conveniently such as is available for other purposes in the aircraft or like vessel, for example a battery having a normal E. M. F. of 24 volts. The motor 30 is also arranged for energization from the same supply line 52 by a conductor 56 extending from conductor 44 through the motor to ground. Thus when the switch 46 is closed, the motor is energized to rotate the cams and current can flow in the circuit of the transformer primary 41 during intervals of closure of the contacts 33. The secondary 58 of the transformer 42 is connected in a circuit which extends through a rectifier 59, and the main or exciting condenser 60, back to the secondary 58 through conductor 61, which is also connected to ground as shown.

The other contacts 34 operated by the cam 32 are connected in a circuit which extends, via conductors 62 and 56, to the ungrounded side of the battery 54 (through the line 44—52 as described above) and which continues, on the other side of the contacts 34, through a conductor 64 to the movable contact 65 of a single-pole double-throw switch of the solenoid-actuated type, i. e. adapted to be shifted by energization of a solenoid 66. The contact 65 is adapted for alternate engagement with one or the other of contacts 67, 68; specifically, the contacts 65, 67 are closed and contacts 65, 68 open when the solenoid is deenergized, a reverse condition of the contacts being produced upon energization of the solenoid 66 and consequent shift of the contact 65. Thus the circuit from the breaker 34 includes two alternatively employed branches represented by conductors 69, 70 extending respectively from the contacts 67, 68, and through the cable sheaths 24, 25, 25a, to the compositors 21, 21a.

The breaker contacts 34 are shunted by a small condenser 71, to prevent arcing.

In the compositor 21, the conductor 69 extends to one side of the primary 72 of a trigger transformer 73, and thence to ground, thus completing the circuit of the breaker 34, through the battery 54. The secondary 74 of the transformer 73 is shunted by an enclosed and sealed spark gap 75 and also extends, through the primary 76 of a high tension transformer 77, e. g. of the Tesla coil type, to a condenser arrangement designated 78 and here shown as comprising three condensers connected in series so as to insure against break-down due to high voltage. The return conductor 80 from the condenser assembly 78 to the secondary 74 may also be grounded as shown. The secondary 81 of the high voltage transformer 77 has one terminal 82 connected through a small bypass condenser 83 to ground and has its other terminal connected to a high tension line or conductor 84 which extends directly to one electrode of the ignitor plug or gap 22, the other electrode of the latter being grounded as shown. As explained above, the compositor device 21 is preferably located very close to the plug 22 on the engine, so that the high voltage lead 84 is extremely short. This lead may be appropriately shielded or sheathed (with suitable provision against break-down) as indicated at 85.

The connecting cable or harness 24, 25 also includes a conductor 87 extending from the condenser 60 through a branch conductor 88 to the terminal 82 of the Tesla coil secondary 81, so that the ungrounded or high side of the condenser 60 is thus directly connected to the output circuit of the high voltage system, for flow of current from the condenser through the gap 22, when the latter breaks down by reason of the spark which the high voltage impulse produces.

The other compositor 21a may be conveniently identical with the compositor 21, the parts designated 72a to 85a inclusive being respectively the same as the similarly numbered parts 72 to 85 in the device 21 and being connected and operated in identical fashion. Thus another branch 89 of the conductor 87 extends to the terminal 82a of the Tesla coil secondary 81a so that current from the condenser 60 may flow through the output circuit and spark gap 22a in the same way as for the gap 22.

For controlling the system, by means of the solenoid switches, the solenoid 48 is connected through a conductor 90 and switch 91 to the conductor 52 and thus to the positive side of the battery 54, the return circuit being effected through ground. Likewise the solenoid 66 is connected through a conductor 92 and a switch 93 to the battery lead 52, returning via ground.

For indication of proper functioning of the apparatus, a small tell-tale lamp 94 is connected directly to the ungrounded side of the condenser 60 by a conductor 96 with return through ground, the circuit including a high resistance 98 or the lamp 94 being otherwise designed, so that relatively inappreciable current drain is required for illumination of the lamp 94 and no deleterious effect is produced on the state of charge of the condenser 60.

The filter system 50 may be of any suitable type, for instance comprising two successive, double sections in separate, grounded shields as shown (being also encased by the principal shield 26), the sections being of a low-pass type and designed to prevent the appearance of high frequency oscillations or pulses in the external line 52 and thus to avoid interference with radio or like equipment.

Where the illustrated apparatus is employed for ignition of an aircraft engine, the switches 91 and 93, and the lamp 94 are located on the instrument panel or other place accessible to the pilot or engineer. The exciter unit 20 may be disposed in any convenient spot, and the compositors (as explained above) are mounted in immediate proximity to the engine, the compositor 21 serving the spark gap 22 of the main combustion chamber and the compositor 21a providing like energization for the gap 22a of the after-burner.

With the apparatus installed as described and shown, its operation is as follows. If the switch 93 is left open, relay 66 is deenergized, so that contacts 65, 67 are closed and the exciter 20 is operatively connected to the compositor 21 but not to the after-burner compositor 21a. Upon closing the main control switch 91, the solenoid 48 is energized, closing the switch 46 and supplying current to the conductor 44. Accordingly the motor 30 commences to rotate, turning the cams 31, 32 at a desired speed, say 1800 R. P. M. Current supply is also now effective to the circuits respectively including the contacts or breakers 33, 34.

As the cam 31 rotates, the contacts 33 are successively closed and opened, sending pulses of current through the transformer primary 41, each pulse building up magnetic flux in the iron core. By the inductive effect of the transformer upon collapse of such flux in its core each time the primary circuit is broken, a pulse of substantial voltage appears across the primary and a corresponding pulse is induced or created in the secondary 58, of stepped-up value, say of the order of 500 volts. From this pulse in the secondary, uni-directional current is allowed to flow in the circuit of the condenser 60, i. e. through the rectifier 59, so as to apply an increment of electrical charge to the condenser. Upon cessation of the charging pulse, the energy increment remains stored in the condenser, since the rectifier prevents passage of current in the opposite direction and since the potential, even at the peak value of 500 volts or so, is insufficient to break down the gap 22.

A similar charging pulse or energy increment is thus supplied to the condenser upon each break of the contacts 33, capacity of the condenser and the number of lobes of the cam 31 being so designed relative to the various other circuit constants and values, that by the time a complete rotation of the cam 31 has been effected (the latter having 11, 17 or other appropriate number of high spots), the condenser 60 is fully charged to the maximum voltage of about 500, i. e. to the maximum accumulation of energy at the peak voltage of the rectified pulses from the transformer secondary 58. The connections of the transformer 42, i. e. the relation between the direction of its windings and the polarity of the primary circuit, are so arranged (as will now be readily understood) that the E. M. F. produced across the secondary terminals upon each opening of the contacts 33 is of proper polarity for passage of the resulting current pulse through the rectifier 59.

The contacts or breaker points 34 provide the triggering pulse for initiation of a high voltage current in the output line 84 of the compositor 21. As shown, one such impulse is effected for each predetermined series of condenser-charging pulses produced by the breaker 33, e. g. one pulse from the single lobe cam 32 for each revolution of the cam 31. While upon initiating rotation of the motor 30, the first pulse from the breaker 34 may come prematurely, i. e. after only a few of the lobes of the cam 31 have passed the follower 35, the operation of cam 32 is thereafter automatically timed and synchronized so that the triggering impulse follows each complete set of charging impulses originated by the cam 31. Indeed, the primary purpose of the ignition procedure is to produce a series of sparks at the points 22, i. e. sparks which very rapidly recur so long as the switch 91 is closed; the timing of the cam-operated breakers is perfect for that purpose throughout any useful period of operation, however short.

Upon each interruption (at the contacts 34) of the circuit through which current from the battery is supplied to the primary 72 of the step-up transformer 73, a pulse of relatively high voltage is induced in the secondary 74. This pulse discharge into the oscillatory circuit that comprises the primary 76 of the high voltage coil 77, the capacitance 78, and the enclosed spark gap 75, such circuit being tuned to a frequency suitably high for proper response of the coil 77, e. g. of the order of 2,000 kilocycles. Accordingly, a train of high frequency oscillations, at still higher voltage, is induced in the secondary 81 of the coil 77, the latter (as intimated above) being a high frequency transformer having relatively low reactance, negligible D. C. resistance and other low loss characteristics (including a core of finely divided iron). The potential of the induced oscillations is sufficient to break down the gap 22, so that a spark is produced by the corresponding current in the circuit of conductor 84. The condenser 83 provides a by-pass or return for high frequency components, thus preventing or attenuating the appearance of corresponding high voltages in the line 87—88 leading back to the condenser 60.

The spark across the gap 22 provides an ionized path, between its electrodes, of lowered resistance such that current may also flow from the condenser 60, i. e. through the lines 87, 88, secondary 81, line 84 and across the gap 22 to return to the condenser via the ground connections. In this manner the accumulated energy of the condenser is promptly discharged through the gap, producing a tremendously fortified, very hot spark. Indeed, experience has shown that the discharge of the condenser is extremely rapid, e. g. of the order of a few micro-seconds, so that the peak energy is extremely high, affording an optimum condition for ignition of the combustible fuel mixture in the engine chamber.

As long as the switch 91 is closed, high energy spark discharges are created at the gap 22 in rapid succession, one for each interruption of the breaker 34. The production of charging and triggering pulses is effected in an automatic, mechanical manner that is practically incapable of derangement or other failure. Since the breaker points 33 and 34 are opened by the positive mechanical force of the cam lobes acting on the followers, a clean, sharp break of each circuit is assured, for example as distinguished from electromagnetic vibrators or the like where magnetic or resilient forces of an impositive character are used. Sticking of the contacts is thus practically impossible. Their corrosion, pitting or other fouling may also be negligible; for instance, with the housing shield 26 hermetically sealed against moisture, no nitric acid will be formed at the contacts, even with such minor arcing as is not suppressed by the condensers 40 and 71.

The operations of charging and discharging the condenser 60 are effected with a minimum of loss, there being no time-delaying resistors in the circuit, or components which represent a loss of power or which retard the release of energy in the spark. The transformer 42 provides, especially by its inductive effect, a voltage suitable for efficient use of the condenser as a reservoir of energy derived from the battery 54.

Although other kinds of motor may be usefully employed, the motor 30 is preferably one (e. g. a suitable shunt-wound, D. C., commutator-type motor) which has a characteristic of voltage-speed proportionality, various motors of this type being known and suitable for the purpose. With such a motor the apparatus may if desired be largely self-regulatory, relative to the operating voltage of the battery 54.

Self-regulation of the apparatus is of special value in view of the wide voltage variation that may be expected of the aircraft battery. For example, suppose the battery to have a normal voltage (E) of 30 volts. When the engine must be re-started during flight, it is usually spinning by windmill effect so that the starting motor need not be used and the battery exhibits its full voltage. On the ground, however, the starting motor is required to spin the turbine elements, and the battery voltage is much reduced, sometimes to no more than 15 volts or so. By the inherent regulation of the present system (including a motor 30 having its speed proportional to the voltage), the same full energization of the capacitor 60 and the same high energy for each spark are obtained at lower as at full voltage of the battery.

In that connection, it will be appreciated that the time required for current to build up to a maximum or steady-state condition in the primary 41 is fixed (regardless of battery voltage) by the time constant of the circuit. Hence in the example given above if it is desired to provide the stated regulation over a battery voltage range from 30 down to 15 or less, the time constant is selected (by appropriately choosing the L and R values of the circuit, which determine it) so that the period of closure of contacts 33 is just sufficient (or preferably, slightly less than sufficient) to bring the current to steady-state value when the motor 30 is at half speed ($E=15$ v.). At full speed operation ($E=30$ v.) the closure period will be only half as long and the current will only build up, so to speak, half way to its then expected steady-value; but the supply voltage will be 30 volts instead of 15 (for half speed), so that the actual current at each break will be the same. Furthermore the number of lobes of the cam 31 is chosen to provide a desired (e. g. maximum) total energization of the capacitor 60 for each revolution when $E=30$. Since the successive energy pulses within such cycle are determined by the value of primary current at break of the contacts 33, it will be seen that the total energy per complete cycle at $E=15$ will be the same desired quantity as at $E=30$ (being the same number of pulses of the same value each). Indeed since the curve of current rise against time in the transformer primary 41 is substantially linear up to a point near the steady-state value, the described regulatory effect occurs throughout the selected range of battery voltages (e. g. 30 down to 15, and to some extent below), providing uniformity of energy value for the pulses delivered to the capacitor.

In consequence, the same high energy spark is delivered at the gap 22 for the lower as well as the highest battery voltages. While there is a correspondingly slower repetition rate of the spark at the lower voltages, the practical tolerance in this respect is relatively wide, and therefore does not militate against the advantages of the described energy regulation, for uniformity of results in jet engine ignition.

It should be noted that the triggering pulse, delivered through the line 69 to the compositor 21, requires no electrical relation to the condenser 60 or its associated circuits; instead of being derived from the condenser voltage or the like (and thus requiring delicate electronic devices), the spark-triggering operation is timed and related to the condenser charging means by positive mechanical connection, i. e. by the cams 31, 32. In these and other respects the present system also facilitates physical separation of the high voltage elements in the compositor 21 from the primary electrical components as contained in the exciter unit 20. The only high voltage path outside of the compositor is the short lead to the spark plug 22, while the low voltage leads 88, 87, 69 may extend any distance required to reach a location suitable for the exciter 20.

The preferred system shown also lends itself to the employment of components having unusually high efficiency. For example, if electromagnetic vibrating devices were used for the contacts 33, the relatively low frequency (100 to 150 cycles) at which such devices must ordinarily operate, would require the transformer 42 to be of a bulky type, having a relatively massive core. In systems of the illustrated type, the transformer 42 may conveniently be such as to have a natural period or frequency of the order of 1000 cycles. Such a transformer may be relatively small, and yet have low losses and afford good voltage regulation.

A further feature of operation of the device is the use of the after-burner ignitor 21a. If a spark is desired at this part of the engine, both the switches 91 and 93 are closed, the operation of the former having the effect described above and the closing of the circuit to the solenoid 66 providing a shift of its contact 65 to close with contact 68. Under such circumstances, the triggering pulses provided by the breaker 34 are directed through the line 70 to the primary 72a of the after-burner compositor. The operation of the system is exactly the same as described in connection with the use of the compositor 21, except that the latter is now out of operation and successive, high energy spark discharges are produced at the after-burner gap 22a.

The apparatus is remarkably reliable despite fouling or like conditions at the spark plugs 22 or 22a. Carbon or other waste deposits tend to build up quite rapidly in jet engines, so as to foul the plugs or even short them completely. When the igniter electrodes or points 22 are partially fouled, the extremely high energy sparks, produced in very rapid succession, tend to burn or blow off the carbon or other foreign matter. If the deposit is so great as to short-circuit the points, the resulting resistance path generates a high heat upon passage of the condenser discharge, and indeed by direct, short-circuited flow of the current pulses intended for charging the condenser 60. In consequence the shorting material is rapidly burned away or at least opened, so that charge may thereafter accumulate on the condenser 60 and subsequent spark discharges will complete the work of cleaning the electrodes. There being no resistive or other loading component in the supply circuit to the condenser, a useful maximum of current is available for the effects just described, i. e. toward the elimination of carbon and other shorting accumulations in the gaps 22 and 22a.

In many cases the sparks produced by the high voltage pulse alone, in the secondary 81, are sufficient to start a jet engine of an airplane on the ground. While high energy (such as supplied by the condenser 60) is required at substantial altitudes or under other severe conditions, the stated characteristic has manifest advantages of additional safety against electrical trouble. In contrast, moreover, to systems where the spark-triggering pulse has to be derived from the condenser circuit, effectuation of the high voltage spark impulses is here fully guaranteed by the integrity of the simple circuit through the breaker 34, even should there be some failure of the condenser 60 or its associated elements.

While the system of Fig. 1 is remarkably long-lived in most situations and in spite of extraordinary current conditions that may be needed every so often to clear short-circuiting accumulations at the spark electrodes 22, Fig. 6 illustrates a modified arrangement which has special advantages of reliability and of safety for the components. In Fig. 6 the compositor 21b is illustrated, the exciter and other elements of the system (not shown) being conveniently the same as in Fig. 1 and being connected to the leads 88, 69. Connected and functioning the same way, the components 72 to 85 inclusive of the exciter 21 of Fig. 1 are similarly identified in Fig. 6, the arrangement being modified, however, to include a closed spark gap 100, connected in series in the high voltage conductor 84 leading to the engine spark gap 22. The spark gap 100 may be of an enclosed, sealed type providing a relatively short gap, yet sufficient to prevent passage of current in the circuit except when the oscillatory high voltage pulse appears in the secondary 81 of the Tesla coil. Thus the gap 100 effectively prevents damage to circuit components (in both the low and high voltage circuits) by any unduly high current or current pulse which might arise when the gap 22 is bridged or shorted by a heavy accumulation of carbon or the like.

Although with the gap 100 in the circuit the total energy obtainable at each spark discharge in the gap 22 may be somewhat reduced, it is still of a relatively high value, ample for the desired purposes of spark ignition. Moreover, the automatic cleaning function of the system, for the igniter electrodes, is essentially the same. Although the periodic high-energy output pulses are not then delivered under short-circuit conditions but are limited in peak value by the necessity of passing as a spark discharge across the gap 100 (and are thus of the same character as normally contemplated when the gap 22 is open), they are still sufficiently intense (at least in progressive effect) to burn away or otherwise to separate the body of carbon bridging the electrodes 22. Thereupon, succeeding high energy sparks across such gap tend to complete the cleaning operation, by blowing off the remaining foreign matter. In all other respects, it will be understood that the arrangement of Fig. 6 functions similarly to the system of Fig. 1.

While if desired a separate exciter 20 may be provided for each compositor unit such as 21 and 21a of Fig. 1, the latter figure involves a convenient economy of parts. Ordinarily, a spark is required at the after-burner only during certain times when the engine is operating, so that the alternative connection of the exciter to either compositor is entirely satisfactory.

Although it is at present believed desirable for utmost reliability to have a separate compositor, and particularly to have a separate motor-actuated cam system 30—31—32, for each main ignition plug or gap, Fig. 7 shows another alternative system wherein two main plugs (for the same engine or for different engines) and two corresponding after-burner plugs may be energized from a single compositor assembly. In Fig. 7, the motor 30, cams 31 and 32 and the entire set of cam followers, breaker contacts, condensers, transformer and other circuit elements designated 33 to 44, 56 to 70, and 87 to 89 are identical with the same numbered parts in Fig. 1, and are similarly arranged and connected. For simplicity of illustration, the filter 50 and switch 46 are here omitted, the controllable connection of the line 44 to the battery 54 being simply indicated by dot-and-dash line 102.

In Fig. 7 the cam 31 actuates another pair of contacts or breaker points 104, arranged (like the contacts 33) to be opened by the cam follower 105 when it is moved out by the high spots of the cam. The circuit of contacts 104 extends from the current supply line 44 through a conductor 106, the primary 107 of a transformer 108 which may be identical with the transformer 42, and thence via the contacts 104 to ground, the contacts being bridged by a condenser 110 to reduce arcing. From one terminal of the secondary 111 of the transformer a circuit extends through the rectifier 112 and condenser 114 back to the other, grounded terminal of the secondary. The ungrounded side of the condenser 114 is connected through conductors 115, and 116 and 117 in parallel, to a pair of compositors 121, 121a identical with the compositors 21, 21a, i. e. as shown in detail in Fig. 1.

The system of Fig. 7 also has another pair of contacts 124, actuated by a cam follower 126 engaging the cam 32, in the same manner as the contacts 34. The correspondingly controlled circuit extends from the current supply line 62, through controller 127, contacts 124 (which are bridged to prevent arcing by a condenser 128), and conductor 130 to the central contact 131 of a single pole double-throw switch having a pair of alternately engageable contacts 133, 134. The arm of the movable contact 131 is mechanically connected to the arm of the contact 65, for operation of both together by the solenoid 66. Thus in the deenergized condition of the latter, contacts 65, 67 and 131, 133 are closed, while upon energization of the solenoid, contacts 65, 68 and 131, 134 are closed. From the contact 133 a conductor 135 leads to the compositor 121 which supplies a main engine spark gap 136. From the contact 134 a conductor 138 leads to the other compositor 121a, adapted to energize an after-burner spark gap 137.

Upon energization of the motor 30 and connection of current supply to the line 44 simultaneous operation is provided of two sparking systems actuated by a single set of cams 31, 32. While energizing impulses are being created by the breaker 33 for the condenser 60, like impulses are established by the breaker 104 for accumulation of charge on the condenser 114. After a predetermined number of impulses, i. e. after a single revolution of the cams, the breaker 34 triggers the high voltage discharge of a compositor, viz. 21 or 21a depending on the position of the contact 65. Likewise, after a single revolution of the cam system, the contacts 124 similarly trigger one of the compositors 121, 121a, depending on the position of the contact 133. Normally the contacts 65, 133 are disposed to operate the main chamber compositors 21, 121, but upon closure of the switch 93 and energization of the solenoid 66, the contacts are shifted, so that both after-burner compositors 21a, 121a may be actuated.

While the two breaker arrangements at each of the cams 31, 32 are shown as disposed 180° apart, i. e. around the periphery of the cams, no special positional relation is required, since the timing of the sparks may ordinarily be wholly independent. Regardless of timing, the entire action is automatic, in producing a series of high energy sparks in the output of one or the other of compositors 21, 21a, and at the same time a series of like, high energy discharges at the gap of one or the other of the compositors 121, 121a. Thus with a single motor and set of cams, a plurality of main chamber or after-burner spark plugs are effectively and essentially simultaneously energized.

As indicated, the exciter and compositor units in all forms of the invention may be not only shielded but hermetically sealed, for protection against effects of low pressure, moisture and the like. Thus as shown somewhat schematically in Fig. 8, wherein the exciter 20 and compositors 21 and 21a of Fig. 1 are illustrated in external views, and wherein various shields, cables and connections are identified with the reference numbers of Fig. 1, the shield 26 of the compositor comprises a metal box 140 having a cover 141. The cover 141 has a depending skirt 142 which overlaps the box portion 140 and is sealed by appropriate material 144, such as solder or a non-metallic sealing compound. Through a removable plug 146, the interior of the box may be filled with essentially dry air at normal atmospheric pressure. Hence at high altitudes, the pressure inside the box 140—141 remains the same as at the surface of the earth, so that leakage or other discharge due to low pressure around the electrical parts is avoided. Likewise the absence of moisture and the impossibility of its access minimize the occurrence of corrosion, e. g. at breaker points, switch contacts and the like. All connecting wires, such as the leads 69, 70 and 87 enter the shield 26 through appropriate sealing material 148. It will be appreciated that the compositor housing 27, 27a may be similarly constructed and sealed, i. e. as shown, and that like provision for sealing the egress of electrical conductors may be afforded at all other points, just as shown with respect to the seal 148.

While other means and methods, such as mechanically driven magnetos or the like, may be employed for producing the timed, low voltage impulses for the condenser charging and spark-triggering circuits, and while other specific contact or breaker arrangements may be utilized in circuits such as that of Figs. 1 or 7, Figs. 2 to 5 illustrate a convenient and compact structure for the operation of devices such as the breakers 33, 34, from motor-rotated cams 31, 32. In Figs. 2 to 5 the motor 30, being of a conventional structure, is indicated digrammatically as enclosed in a suitable housing 150, and as having a shaft 152 which is journalled in a ball bearing 154 and projects endwise from the motor. At the same end of the housing 150, the latter carries a projecting support or frame 156 which serves to mount a transverse shaft 157, supported by ball bearings 158, 159. A worm gear 160 pinned to the shaft at the center, is engaged by a worm 162 on the motor shaft 152, for corresponding drive of the shaft 157. By virtue of the large gear reduction thus afforded, a small, light motor 30 may be employed, operating at a very high speed yet delivering ample power to turn the cam shaft at a satisfactorily rapid rate.

At one end the shaft 157 carries the cam 31 which cooperates with the oppositely disposed follower pins 35, 105, the pins being respectively mounted on springs 163, 164 that are carried by suitable supporting assemblies 165, 166. The cooperating breaker contacts 33, 104 are respectively constituted by stationary contacts 168, 169 and movable contacts 170, 171, the latter being carried by connecting springs 172, 173 which are in turn respectively mounted on the support assemblies 165, 166. As shown, the arrangement is such that when the follower 35 or 105 rides up on the high part of a cam lobe, its outer end engages a spring arm 172 or 173, so as to open the corresponding contacts. The stationary contacts 168, 169 are mounted on laterally extending portions of terminal plates 174, 175 secured on the adjacent face of the frame 156. The supporting parts 165, 166, being assembled on the screws 176, 177 respectively, include appropriate insulating separators and also suitable structure connected to the springs 171, 172 respectively, so the screws constitute electrical terminals for the ungrounded contacts 170, 171.

The other end of the shaft 157 carries the cam 32 and associated therewith the frame 156 carries another set of cam follower pins and contact assemblies similar to those shown in Fig. 2 and arranged to function in like manner (and therefore not described in detail), the cam followers 36 and 126 being thus arranged to open the contacts 34 and 124 respectively during passage of the high spot portion of the cam 32.

While the arrangement of Figs. 2 to 5 is shown with sufficient sets of breaker or contacts points for embodiment of the multiple system illustrated in Fig. 7, it will be appreciated that other numbers of contacts may be arranged for operation from each single cam, the simple system of Fig. 1 requiring only one set of contacts and associated cam follower at each side of the frame 156.

The number of lobes to be embodied in the cam 31 will depend, as will now be appreciated, on the number of charging impulses desired for the condenser 60 (Fig. 1) on each cycle, i. e. preliminary to each spark discharge. The actual contour of the lobes of the cam may also be designed to suit the precise requirements of service; for example, good results have been obtained with the lobs shaped and spaced to provide approximately equal intervals of closure and of open condition of the contacts. As generally indicated in Fig. 1, it is usually desirable that the opening or break movement be rapid and thus produced by a fairly steep surface of the cam lobe, while the closing or return movement can be as slow or moderate as possible, i. e. by a more gentle slope of the cam lobe, to prevent bounce or other undesirable motion of the cam follower.

The trigger circuit cam 32 should similarly have a steep breaking surface 39 (Fig. 1), the cam being mounted, relative to the cam 31, so that the break of contacts 34 occurs somewhat after a selected breaking operation of the contacts 33 and well before the next breaking operation of contacts 33. Thus the condenser 60 will receive the full benefit of a complete cycle of charging impulses, it being generally immaterial whether the spark discharge overlaps, so to speak, a time when the contacts 33 are closed, providing the spark discharge is over before the contacts 33 next open. Since the discharge is preferably very brief, structures of the sort illustrated are adapted to afford ample time for the triggering and discharge function between two breaking operations of the contacts 33.

The time of closure of the triggering contacts 34 is ordinarily not critical, although for economy and best efficiency the cam 32 can be contoured so that the make of the contacts 34 is just sufficiently ahead of the break to allow the energizing current to build up to a high enough value for inducing proper secondary voltage in the triggering circuit (i. e. of the secondary 74) at the immediately succeeding break. Under such circumstances, the contacts 34 are kept open, following such break, until the next closing action. Thus as shown in Fig. 1, the cam 32 may have a high contour for nearly all of its circumference, interrupted by a low spot of short duration.

Simply by way of example, an effective system of the sort shown in Fig. 1, for operation with a 24 volt battery 54 has included a cam 31 having from 10 to 20 lobes (a 17 lobe cam having been found particularly effective), the motor 30 being of such character as to rotate the cams at rates of 1000 to 1800 R. P. M., depending on the effective voltage of the battery 54 as explained above. Under such circumstances, from 10 to 30 sparks per second are provided at the points 22 or 22a, each spark representing termination of a complete cycle or revolution of the cams and thus a complete cycle of cumulative charge of the condenser 60, triggered by break of the contacts 34.

In the specific system of this example the transformer 42 has a secondary to primary turns ratio of about 2:1. The peak voltage appearing across the primary 41, e. g. at break of the contacts 33, may assume a value, because of the inductive effect, of the order of 200 to 300 volts, so that the maximum voltage to which the condenser 60 is charged is about 500 volts. The step-up transformer 73 may have a high secondary to primary turns ratio, and is thus designed to provide a peak voltage across its secondary 74 of the value of 5000 to 15,000 volts (depending on the selected character of the transformer and on the voltage of the battery 54) upon the triggering break in the circuit through the contacts 34.

The high frequency transformer or coil 77 is conveniently of a type having extremely low resistance and low reactance, and involving a relatively small number of turns in both primary and secondary; not only are the required high voltage oscillations thus produced with maximum efficiency and minimum loss, but there is likewise substantially no loss or load in the circuit 87—83—84 whereby current flows from the condenser 60 through the gap 22. In all of these ways, brevity and high peak energy of the discharge are promoted. For instance, the transformer 77 may be of the Tesla coil type having a primary with 8 or 9 turns and a secondary of about 50 turns, mounted on a low-loss core. Experience indicates that the E. M. F. in the output circuit represented by the conductor 84 should provide a voltage of the order of 6000 to 8000 volts across the gap 22, the components being preferably designed to afford a peak potential of 10,000 to 15,000 volts, for ample margin of reliability.

Although the system here described as an example was designed to yield an energy of about 1 joule or so in each spark, it will be understood that the parts or components may be widely modified, i. e. to suit various requirements of energy, of repetition rate or of other characteristics of the spark; for instance, by employing a very large capacitor 60 or by charging it to a higher voltage, energy up to 10 joules or so may be achieved in each spark. In a system releasing about 1 joule per spark, the condenser 60 or 114 may have a value of 4 to 8 mfd. By way of example of other parts of the circuit, the arc-suppressing condensers 40, 71 were 0.5 mfd., and the high frequency by-pass condensers 83, 83a, each 0.01 mfd. Using a Tesla coil of the type described above, the value of each of the three condensers 78 was 0.003 mfd., affording a total series capacity of 0.001 mfd. The rectifiers 59, 112 may be of the cooper oxide or preferably the selenium type.

It will now be appreciated that the disclosed procedure and systems fully satisfy the several objects set forth above, in affording a reliable and efficient spark ignition for jet engines, i. e. such as to produce, even under very adverse conditions, a rapid succession of sparks of high peak and high total energy. Throughout the system the highest voltage is relatively low, e. g. of the intermediate value of not more than about 500 volts, except inside the sealed compositor assembly and except in the short leads to the ignitor plugs. The apparatus is automatically responsive to control by simple instrumentalities, such as the switches 91 and 93; indeed in the preferred arrangement these merely effect the energization of the solenoids 48, 66, so that the operating current in the line 52 need not pass to the control panel itself.

Fig. 9 shows a further modified circuit for a compositor, which may be substituted, for example, for each of the compositors 21 and 21a in Fig. 1. Like reference numbers being here employed, it will be understood that the triggering pulse is delivered by the conductor 69 to the primary 72 of the transformer 73, while the stored energy of the capacitor 60 (Fig. 1) is ready to be delivered by the conductor 88. The circuit of the secondary 74 of the transformer 73 here extends through a capacitor 180, the primary 76 of the high tension transformer 77 and the spark plug gap 22, and returns via ground. The capacitor 180 and primary 76 are shunted by the enclosed gap 181 (i. e. a gap in a gas-filled envelope). The capacity of the capacitor 180 being higher than that of the gap 22, the division of voltage between them puts a correspondingly higher voltage across the gap 22 in immediate response to the triggering pulse, for example a voltage 10 times that across the capacitor 180 when the capacity of the latter is 10 times that of the plug gap 22. The arrangement is such that the gap 22 breaks down under the stated high voltage; as soon as the gap 22 thus becomes conductive, greatly reducing the voltage drop across it, the voltage across the elements 180 and 76 becomes correspondingly high, causing breakdown of the enclosed gap 181.

In consequence of the resulting conductive path completing the connection of the capacitor 180 across the primary 76, oscillatory discharge of the high tension transformer 77 is triggered, i. e. with respect to the circuit of its secondary 81, which extends through another enclosed gap 182 and the high frequency by-pass capacitor 83, returning via ground and the spark plug gap 22. As in preceding figures, the high energy supply conductor 88 is connected to this circuit, but here at a point separated from the secondary 81 and gap 22 by the enclosed gap 182. The high tension, oscillatory discharge in the circuit of the secondary 81, however, breaks down the gap 182, so that current may then flow from the line 88 through the spark plug gap 22. By this sequence of events the gap 22 has first been rendered conductive, and finally a conductive path has been established (through the gap 182) for the desired discharge of the stored energy (from the capacitor 60, Fig. 1) through the ignition gap 22.

It is to be understood that the invention is not limited to the specific embodiments herein shown and described, but may be carried out in other ways without departure from its spirit.

I claim:

1. In engine ignition apparatus, in combination, a rotatable member, means actuated thereby and including an electrical supply circuit, for establishing successive, spaced, current impulses in said circuit, condenser means, means connected to said circuit and said condenser means and successively energized by said impulses for supplying corresponding, charging impulses to said condenser means, said last-mentioned means including means adapted to inhibit discharge of said condenser means while said successive charging impulses are supplied thereto, a second means actuated by said rotatable member and including a current supply circuit, for establishing a triggering current impulse in said last-mentioned supply circuit, said second impulse-establishing means being timed with said first impulse-establishing means to establish the triggering impulse after at least a predetermined number of said first-mentioned charging impulses have been supplied to the condenser means, and means connected to said second supply circuit and including an output circuit adapted to extend to an ignition spark gap, for converting said triggering impulse into a high voltage sparking impulse in said output circuit, said output circuit being connected with said condenser means, for discharge of said condenser means in said output circuit when said sparking impulse causes a spark through the ignition gap.

2. The apparatus described in claim 1, in which said first and second impulse-establishing means comprise means supplying low voltage current to said supply circuits, switch means respectively associated with the circuits, and cam means driven by the rotatable member for operating the switch means.

3. In engine ignition apparatus, in combination, electrical condenser means, a pair of low voltage, current supply circuits, each of the supply circuits having electrical contacts therein adapted to be opened and closed for establishing current impulses in the corresponding supply circuit, means connected intermediate one of said supply circuits and the condenser means and energized by successive current impulses in the supply circuit, for introducing corresponding charging impulses into the condenser means for accumulation of charge therein, means adapted to be triggered by a current impulse and having an output adapted to extend to an ignition gap, for initiating spark discharge at said gap in response to the impulse, means for connecting the second of said supply circuits to the spark initiating means, to transmit a current impulse from said second supply circuit to trigger the spark initiating means, means for connecting the condenser means with said output to effectuate release of the accumulated condenser charge into the spark discharge, rotatable cam means for actuating the first-mentioned contacts, rotatable cam means for actuating the second-mentioned contacts, a motor for rotating both said cam means, said cam means being shaped and arranged relative to each other so that the second-mentioned contacts are opened only after the first-mentioned contacts have been opened a predetermined number of times, whereby a triggering impulse is produced only after a predetermined plurality of charging impulses have been supplied to the condenser means.

4. Engine ignition apparatus as described in claim 3, which includes a conducting line adapted to extend to a source of current, both said supply circuits and said motor being connected to said line for energization thereby, and switch means in said line for simultaneously initiating operation of the motor and energizing said supply circuits.

5. In engine ignition apparatus, in combination, electrical condenser means, means for producing successive impulses of current at a low voltage, inductive means connected intermediate said current producing means and said condenser means, and energized by said current impulses, for producing correspondingly successive electrical impulses at an intermediate voltage which is substantially higher than the aforesaid low voltage, substantially resistance-free, unidirectionally conductive means for conducting current impulses from said inductive means to the condenser means to accumulate charge in the latter while preventing flow of current away from the latter, high voltage source means adapted to respond to a triggering impulse and including an output circuit adapted to extend to an ignition gap, for establishing a high voltage current in said output circuit to initiate a spark discharge at said gap, said condenser means being connected to said output circuit for release of its accumulated charge into the spark discharge, and a supplemental spark gap in said output circuit, adapted to prevent current flow in the latter except when high voltage is established by the high voltage source means.

6. In engine ignition apparatus, in combination, electrical condenser means, mechanically actuated means for supplying successive charging impulses to said condenser means, for accumulation of charge therein, means adapted to receive an energizing impulse and including an output circuit adapted to extend to an ignition gap, for initiating a spark discharge at said gap in response to the energizing impulse, means timed with said mechanically actuated means for supplying an energizing impulse to said spark-initiating means after a plurality of charging impulses have been supplied to the condenser means, means for connecting said condenser means with said output circuit, for effectuating release of the accumulated charge of the condenser means into said spark discharge, and a supplemental spark gap in said output circuit, adapted to be traversed by a spark discharge when the aforesaid spark discharge is produced by the spark-initiating means and adapted to prevent passage of current in said output circuit at other times.

7. In engine ignition apparatus, in combination, electrical condenser means, mechanically actuated means for supplying successive charging impulses to said condenser means, for accumulation of charge therein, means mechanically timed with said impulse supplying means for producing a triggering current impulse after a plurality of charging impulses have been supplied to the condenser means, said impulse-supplying and impulse-producing means having conductor means adapted to extend to a source of current at low voltage, for energizing both said means, sealed enclosure means surrounding said condenser means and impulse-supplying and impulse-producing means, for maintaining the same in substantially constant atmospheric conditions, high voltage source means adapted to be actuated by a triggering impulse and having an output adapted to extend to an ignition gap, sealed enclosure means surrounding said high voltage source means, for maintaining the latter under substantially constant atmospheric conditions, cable means extending between said enclosures and including conductor means extending from the triggering impulse-producing means to the high voltage source means and conductor means extending from the condenser means to said output, for respectively actuating the high voltage source means to initiate spark discharge at the gap, and effectuating release of the accumulated charge of the condenser into said spark discharge.

8. In engine ignition apparatus, in combination, electrical condenser means, means including a current supply circuit, contacts in said circuit and means for periodically operating said contacts, to supply successive charging impulses to the condenser means for accumulation of charge therein, means including another current supply circuit, contact means and means timed with the first-mentioned contact-operating means, for operating said last-mentioned contacts to produce a current impulse in said second-mentioned supply circuit after a plurality of charging impulses have been supplied to the condenser means, sealed metallic shielding means enclosing said condenser means and said impulse-supplying and charge-producing means, for maintaining all of said means under substantially constant atmospheric condition, means adapted to be actuated by a triggering impulse and having an output adapted to extend to an ignition gap, for initiating spark discharge at said gap, and means including connecting means extending from said second-mentioned supply circuit to the spark-initiating means and connecting means extending from the condenser means to said output, for respectively actuating the spark-initiating means and effectuating release of the accumulated charge of the condenser into the spark discharge.

9. In engine ignition apparatus, in combination, electrical condenser means, a current supply circuit, mechanically actuated means for repeatedly making and breaking current flow in said circuit, means inductively and unidirectionally coupling said circuit to the condenser means for supplying corresponding charging impulses in response to the repeated interruptions of the supply circuit, for accumulation of charge in the condenser means, a plurality of high voltage source means each adapted to be operated by a triggering impulse and each having an output adapted to extend to a corresponding ignition gap, for initiating a spark discharge in such corresponding gap upon supply of the triggering impulse to the corresponding source means, a second current supply circuit, means mechanically actuated and timed with the first mechanically actuated means, for making and breaking current flow in said second supply circuit, to produce a triggering impulse after a plurality of charging impulses have been supplied to the condenser means, and means for selectively connecting said second supply circuit with each of said high voltage source means, for transmitting the triggering impulse to any selected one of the high voltage source means, said condenser means being connected to the outputs of the high voltage source means, for release of the accumulated charge of the condenser means into the spark discharge initiated by the high voltage source means which selectively receives the triggering impulse.

10. Engine ignition apparatus as described in claim 9 in which each of the mechanically actuated means comprises a cam device, said cam devices being mechanically coupled together, and which includes a common motor drive means for the cam devices, and a conducting line adapted to extend to a source of current, both of the aforesaid supply circuits and said motor drive means being connected to said line for energization thereby.

11. Engine ignition apparatus as described in claim 10 which includes a switch in said line, remotely controllable electromagnetic means for operating said switch and remotely controllable electromagnetic means for operating the selective connecting means of the second supply circuit.

12. In engine ignition apparatus, in combination, electrical condenser means, means for charging said condenser means with electrical energy, high voltage source means transiently operable in response to a triggering impulse and including an output circuit adapted to extend to an ignition gap, for establishing a high voltage current in said output circuit to initiate a spark discharge at said gap, means for supplying a triggering impulse to the high voltage means when the condenser means is charged, said condenser means being connected to said output circuit for release of its charge therein when said current is flowing in said circuit, and a supplemental spark gap in said output circuit in series with said ignition gap, said supplemental gap being adapted to prevent current flow in the latter except when high voltage is established by the high voltage means.

13. Apparatus for accumulating an electric charge at a predetermined potential from a source of unidirectional electrical energy having a lower potential, comprising a transformer having primary and secondary winding means, a set of electrical contacts, primary circuit means including said contacts and said primary winding means in series and adapted for connection to said source to complete a primary circuit, contact operating means movable to close and open said contacts and thereby to initiate and terminate unidirectional current impulses in said circuit, a condenser, an asymmetric current-conducting unit, a secondary circuit including said secondary winding means, said condenser and said asymmetric unit in series, said transformer being effective upon opening of said primary circuit to set up in the secondary winding a transient electromotive force having a high initial impulse in a direction determined by the direction of current flow in the primary winding, said asymmetric unit being poled to conduct the current impulses produced by said initial electromotive force impulses and to block substantially all current impulses of opposite polarity so that the electric charges making up the current impulses passing through said asymmetric unit are stored on said condenser.

14. Apparatus for periodically accumulating and discharging a charge of electricity having a predetermined energy content and a predetermined potential from a source of unidirectional electrical energy having a lower potential, comprising a transformer having primary and secondary winding means, a set of electrical contacts, primary circuit means including said contacts and said primary winding means in series and adapted for connection to said source to complete a primary circuit, contact operating means movable to close and open said contacts and thereby to initiate and terminate unidirectional current impulses in said circuit, a condenser, an asymmetric current-conducting unit, a secondary circuit including said secondary winding means, said condenser and said asymmetric unit in series, said transformer being effective upon opening of said primary circuit to set up in the secondary circuit a transient electromotive force having a high initial impulse in a direction determined by the direction of current flow in the primary winding, said asymmetric unit being poled to conduct the current impulses produced by said initial electromotive force impulses and to block substantially all current impulses of opposite polarity, so that the electric charges making up the current impulses passing through said asymmetric unit are stored on said condenser, normally non-conductive discharge circuit means for said condenser, trigger means operable to render said discharge circuit means conductive and thereby to discharge said condenser, and means to drive said contact operating means and said trigger means synchronously to operate the trigger means after the contacts have been opened and closed a predetermined number of times.

15. Apparatus for accumulating an electric charge having a predetermined potential from a source of unidirectional electrical energy subject to variations in potential, comprising a transformer having primary and secondary winding means, a set of electrical contacts, primary circuit means including said contacts and said primary winding means in series and adapted for connection to said source to complete a primary circuit, contact operating means movable to close and open said contacts and thereby to initiate and terminate unidirectional current impulses in said circuit, a condenser, an asymmetric current-conducting unit, a secondary circuit including said secondary winding means, said condenser and said asymmetric unit in series, said transformer being effective upon opening of said primary circuit to set up in the secondary winding a transient electromotive force including a high initial impulse having a direction determined by the direction of current flow in the primary winding and a value determined by the primary current flowing at the instant of contact opening, said asymmetric unit being poled to conduct the current impulses produced by said initial electromotive force impulses and to block substantially all current impulses of opposite polarity, so that the electric charges making up the current impulses passing through said asymmetric unit are stored on said condenser, the current flowing in said primary circuit at the instant of contact opening being determined by the time constant of the primary circuit, the length of the period of contact closure, and the potential of the source, and an electric motor electrically connected to said source to receive energy therefrom and mechanically connected to said contact operating means to drive the same, said motor having a voltage-speed characteristic such that as the potential of the source decreases, the motor speed decreases and the time of closure of said contacts increases, the increase in the time of contact closure tending to compensate for the decrease in the potential of the source, so that the current flow in the primary circuit is substantially the same when the contacts open, regardless of variations in the source potential.

16. Apparatus for accumulating an electric charge having a predetermined potential from a source of unidirectional electrical energy subject to variations in potential, comprising a pair of contacts, electric circuit means including said contacts and adapted for connection to said source to complete a circuit, contact operating means movable to close and open said contacts and thereby to initiate and terminate unidirectional current impulses in said circuit, a condenser, means operatively connecting said condenser and said circuit and effective to transfer to said condenser increments of electric charge whose magnitude is determined by the magnitude of the current flowing in said circuit at the instant of opening the contacts, and an electric motor electrically connected to said source to receive energy therefrom and mechanically connected to said contact operating means to drive the same, said motor having a voltage-speed characteristic such that as the potential of the source decreases, the motor speed decreases and the time of closure of said contacts increases, the increase in the time of contact closure tending to compensate for the decrease in the potential of the source, so that the current flow in the primary circuit is substantially the same when the contacts open, regardless of variations in the source potential.

17. Apparatus for periodically accumulating and discharging a charge of electricity having a predetermined energy content, comprising a condenser, means to supply to said condenser separate timed increments of electric charge, mechanically driven means for timing said increments, a normally non-conductive discharge circuit for said condenser, trigger means operable to render said discharge circuit conductive and thereby to discharge said condenser, and means to drive said timing means and said trigger means synchronously to operate the trigger means after a predetermined number of charge increments have been supplied to said condenser.

18. Spark producing apparatus including a transformer having primary and secondary windings, a set of electrical contacts, primary electrical circuit means including said contacts and said primary winding in series and adapted for connection to a source of unidirectional electrical energy to complete a primary circuit, contact operating means movable to close and open said contacts and thereby to initiate and terminate unidirectional current impulses in said circuit, a condenser, an asymmetric current-conducting unit, a secondary circuit including said secondary winding, said condenser and said asymmetric unit in series, said transformer being effective upon opening of said primary circuit to set up in the secondary winding a transient potential having an initial impulse greater than the potential of said source and in a direction determined by the direction of current flow in the primary winding, said asymmetric unit being poled to conduct the current impulses produced by said initial electromotive force impulses and to block substantially all current impulses of opposite polarity, so that the electric charges making up the current impulses passing through said asymmetric unit are stored on said condenser at a storage potential greater than said source potential, means defining a spark gap having a breakdown potential greater than said storage potential and a discharge-sustaining potential less than said storage potential, a normally non-conductive discharge circuit connecting said condenser and said spark gap, trigger means operable to initiate an electric discharge across said gap and thereby to render said discharge circuit conductive and to discharge said condenser across said gap, and means to drive said contact operating means and said trigger means synchronously to operate the trigger means after the contacts have been opened and closed a predetermined number of times.

19. Apparatus for producing sparks having a predetermined energy content from a source of unidirectional electrical energy subject to variations in potential, comprising a pair of contacts, electric circuit means including said contacts and adapted for connection to said source to complete a circuit, operating means movable to close and open said contacts and thereby to initiate and terminate unidirectional current impulses in said circuit, a condenser, means operatively connecting said condenser and said circuit and effective to transfer to said condenser increments of electric charge whose magnitude and potential are determined by the magnitude of the current flowing in said circuit at the instant of opening the contacts, electric motor means electrically connected to said source to receive energy therefrom and mechanically connected to said contact operating means to drive the same, said motor means having a voltage-speed characteristic such that as the potential of the source decreases, the motor speed decreases and the time of closure of said contacts increases, the increase in the time of contact closure tending to compensate for the decrease in the potential of the source, so that the current flow in the primary circuit is substantially the same when the contacts open, regardless of variations in the source potential, and said increments of charge are substantially equal and are stored on said condenser at a storage potential greater than the maximum potential of said source, means defining a spark gap having a breakdown potential greater than said storage potential and a discharge-sustaining potential less than said storage potential, a normally non-conductive discharge circuit connecting said condenser and said spark gap, trigger means operable to initiate discharge across said gap and thereby to render said discharge circuit conductive and to discharge said condenser across said gap, and means to drive said contact operating means and said trigger means synchronously to operate the trigger means after the contacts have been opened and closed a predetermined number of times.

20. Apparatus for producing sparks having a predetermined energy content from a source of unidirectional electrical energy, comprising a condenser, means to supply to said condenser separate timed increments of electric charge, mechanically driven means for timing said increments, a normally non-conductive discharge circuit adapted to connect said condenser to a spark gap, trigger means operable to initiate a discharge across said gap and thereby to render said discharge circuit conductive and to discharge said condenser across said gap, and means to drive said timing means and said trigger means synchronously to operate the trigger means after a predetermined number of charge increments have been supplied to said condenser.

21. Spark producing apparatus, comprising an exciter unit including an exciter condenser and means for accumulating a charge of electricity on said condenser at a predetermined potential; a compositor unit located adjacent a spark gap having a breakdown potential greater than said predetermined potential and a discharge-sustaining potential lower than said predetermined potential, said compositor unit comprising a transformer having one secondary winding terminal adapted for connection to one electrode of said spark gap and a high frequency by-pass condenser electrically connected to the other secondary winding terminal and adapted for connection to the other electrode of the spark gap; means including a shielded cable electrically connecting one terminal of the exciter condenser to said other secondary winding terminal, means adapted to electrically connect the other exciter condenser terminal to the other spark gap electrode, and trigger means for supplying to the transformer primary winding a high frequency trigger impulse of potential sufficient to produce in the secondary winding a potential greater than the breakdown potential of the spark gap, said trigger means and said transformer being effective to initiate a spark discharge at said exciter gap, whereupon said condenser discharges through the gap, said high frequency by-pass condenser being effective to shunt said high frequency impulse from said exciter condenser and its connections.

22. Spark producing apparatus as defined in claim 21, in which said trigger means is in said exciter unit and is connected to said transformer primary winding through said cable; said accumulating means comprises a pair of cooperating contacts, motor means driving said contacts to close and open them intermittently, electrical circuit means including said contacts and effective upon closure and opening thereof to produce an electric impulse, and means operatively connected to said circuit means and effective to supply an increment of electric charge to said condenser in response to each said impulse; and said trigger means comprises a second pair of cooperating contacts, and means operatively connecting said motor means to said trigger contacts to close and open said trigger contacts to produce said trigger impulse after said accumulator contacts have been closed and opened a predetermined number of times to supply to said condenser a corresponding number of increments of electric charge.

23. The method of accumulating an electric charge having a predetermined energy content from a source of electrical energy subject to variations in potential, comprising the steps of creating a series of impulses of current from said source, transferring the energy of a predetermined plurality of said impulses to a charge accumulator, and varying the length of said impulses inversely with the potential of said source.

24. The method of creating electrical impulses, each having substantially the same predetermined maximum current value from a source of unidirectional electrical energy subject to variations in potential, comprising the steps of periodically closing and opening a circuit including said source and an impedance, and varying the length of the periods of closure of said circuit inversely with the potential of said source.

25. Apparatus for creating electrical impulses each having a predetermined maximum current value from a source of unidirectional electrical energy subject to variations in potential, comprising circuit means including a pair of contacts and an impedance and adapted for electrical connection to said source to complete a circuit, operating means to move said contacts repeatedly between closed and open positions, and motor means drivingly connected to said contact operating means and adapted for electrical connection to said source for energization thereby, said motor means having a voltage-speed characteristic such that as the potential of the source decreases, the speed of the motor means decreases and the time of closure of said contacts increases, the increase in contact closure time tending to compensate for the decrease in the source potential, so that the current flow is substantially the same when the contacts open, regardless of variations in the source potential.

References Cited in the file of this patent

UNITED STATES PATENTS

| | | |
|---|---|---|
| 1,745,830 | Bethenod | Feb. 4, 1930 |
| 2,013,878 | Cotter et al. | Sept. 10, 1935 |
| 2,409,202 | Francis | Oct. 15, 1946 |
| 2,456,475 | Vargin et al. | Dec. 14, 1948 |
| 2,472,671 | McNulty | June 7, 1949 |
| 2,536,143 | Short et al. | Jan. 2, 1951 |
| 2,540,177 | Short et al. | Feb. 6, 1951 |
| 2,546,550 | Laird | Mar. 27, 1951 |
| 2,571,788 | Tognola | Oct. 16, 1951 |
| 2,632,133 | McNulty | Mar. 17, 1953 |